US008329059B2

(12) United States Patent
Mitsuya et al.

(10) Patent No.: US 8,329,059 B2
(45) Date of Patent: Dec. 11, 2012

(54) METHOD FOR PRODUCING ORGANIC ELECTROLUMINESCENT DEVICE, ORGANIC ELECTROLUMINESCENT DEVICE, AND ELECTRONIC APPARATUS

(75) Inventors: Masayuki Mitsuya, Suwa (JP); Shunichi Seki, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 300 days.

(21) Appl. No.: 12/536,217

(22) Filed: Aug. 5, 2009

(65) Prior Publication Data

US 2009/0297695 A1 Dec. 3, 2009

Related U.S. Application Data

(63) Continuation of application No. 11/072,958, filed on Mar. 7, 2005, now abandoned.

(30) Foreign Application Priority Data

Apr. 12, 2004 (JP) ................................ 2004-116781

(51) Int. Cl.
*C09K 11/06* (2006.01)
*B05D 5/06* (2006.01)

(52) U.S. Cl. .................................... 252/301.16; 427/66

(58) Field of Classification Search .................... 427/66; 252/301.16

See application file for complete search history.

(56) References Cited

U.S. PATENT DOCUMENTS 5,821,003 A 10/1998 Uemura et al.
6,830,494 B1 12/2004 Yamazaki et al.
6,843,937 B1 1/2005 Kiguchi et al.
2002/0185635 A1 12/2002 Doi et al.
2002/0197477 A1 * 12/2002 Ata et al. ..................... 428/408
2003/0003359 A1 * 1/2003 Banno et al. ................. 429/189
2003/0050299 A1 3/2003 Hirth et al.
2003/0164477 A1 * 9/2003 Zhou et al. .................... 252/500
2004/0030080 A1 2/2004 Chang et al.
2005/0067949 A1 3/2005 Natarajan et al.

FOREIGN PATENT DOCUMENTS

JP A-11-40358 2/1999
JP A-2002-170677 6/2002
JP A-2002-352954 12/2002
JP A-2004-39297 2/2004
JP A-2004-39561 2/2004
JP A-2004-355913 12/2004

* cited by examiner

*Primary Examiner* — James Lin

(74) *Attorney, Agent, or Firm* — Oliff & Berridge, PLC

(57) ABSTRACT

To provide a method for producing an organic electroluminescent device having luminescent characteristics of high efficiency and prolonged lifetime and in which the occurrence of defects is suppressed, the organic electroluminescent device, and an electronic apparatus. A method for producing an organic electroluminescent device including a first electrode, a second electrode, and a functional layer disposed between the first electrode and the second electrode, the functional layer including at least a luminescent layer, the method includes the steps of mixing a solvent and a functional material to produce a functional solution; and applying the functional solution to form the functional layer by a wet film formation process, wherein, before the functional solution is produced, the solvent is subjected to dehydration and deoxygenation in order to remove water and oxygen in the solvent.

3 Claims, 6 Drawing Sheets

| | Case 1 | Case 2 | Case 3 |
|---|---|---|---|
| | [MS+N2] | [MS] | No |
| Water content | 5 to 15 ppm | 10 to 15 ppm | 100ppm |
| Oxygen content | 10ppm | 50ppm | 100ppm |
| Number of failed films | 0 | Several | >100 |

FIG.5

| | Case 1 | Case 2 | Case 3 |
|---|---|---|---|
| | [MS+N2] | [MS] | No |
| Water content | 5 to 15 ppm | 10 to 15 ppm | 100ppm |
| Oxygen content | 10ppm | 50ppm | 100ppm |
| Number of failed films | 0 | Several | >100 |

FIG.6

| | Case 4 | Case 5 |
|---|---|---|
| | N2 | Air |
| Ink | Ink produced with solvent in case 1 | |
| Element lifetime | Improved about double that in case 5 | — |
| Luminous efficiency | Improved about 1.3 times that in case 5 | — |

FIG.7

| | Atmosphere in forming film by inkjet process | | |
|---|---|---|---|
| Treatment of solvent for ink | | N2 | Air |
| | [MS+N2] | Excellent | good |
| | No | Known art | poor |

METHOD FOR PRODUCING ORGANIC ELECTROLUMINESCENT DEVICE, ORGANIC ELECTROLUMINESCENT DEVICE, AND ELECTRONIC APPARATUS

CROSS-REFERENCE TO RELATED APPLICATIONS

This is a Continuation of application Ser. No. 11/072,958 filed on Mar. 7, 2005. This application claims the benefit of Japanese Patent Application No. 2004-116781, filed on Apr. 12, 2004. The entire disclosures of the prior applications are hereby incorporated by reference in their entirety.

BACKGROUND

The present invention relates to a method for producing an organic electroluminescent device, the organic electroluminescent device, and an electronic apparatus.

In recent years, demands for electro-optical devices having lower power consumption than that of general cathode-ray tubes (CRTs) and having lower profile than liquid crystal displays (LCDs) have been increasing with diversification of information equipment. An organic electroluminescent device (hereinafter, referred to as “organic EL device”), which is one of such electro-optical devices, has been receiving attention. The organic EL device includes a functioning layer, such as a hole injection layer or a luminescent layer, between counter electrodes. With respect to a process for forming such a functional layer, a wet process for forming a film with a functional polymeric material is known. The wet process for forming a film has a cost advantage over a vapor deposition process in producing an organic EL device.

An atmosphere excluding oxygen and moisture is required for such a wet process for forming a functional layer. Use of the functional polymeric material constituting the functional layer easily forms dark spot defects due to oxygen and moisture, thus leading to the deterioration of luminescent characteristics and the reduction in luminescent lifetime. Therefore, the formation of the functional layer requires an atmosphere excluding oxygen and moisture.

A wet process for forming a film in a nitrogen atmosphere or an inert atmosphere has recently been disclosed, each atmosphere having a moisture content of 1,000 ppm or less (for example, see Patent Document 1).

Japanese Unexamined Patent Application Publication No. 2002-352954.

SUMMARY

The Patent Document discloses that exclusion of oxygen and moisture, which cause the deterioration of the device, can suppress the deterioration of the luminescent characteristics. However, the Inventors confirmed that satisfactory luminescent characteristics and luminescent lifetime cannot be achieved according to this art.

It is an object of the present invention to provide a method for producing an organic electroluminescent device with luminescent characteristics of high efficiency and prolonged lifetime, the organic electroluminescent device, and an electronic apparatus, the method solving the problem in such known art and suppressing the occurrence of defects.

The Inventors confirmed that satisfactory luminescent characteristics and luminescent lifetime cannot be achieved according to the art disclosed in the Patent document. For example, with respect to a droplet discharging method in which droplets are discharged through a nozzle by exerting a predetermined force on a liquid, when a liquid in the nozzle contains gas molecules, a failure in discharging occurs because of insufficient forces being exerted on the liquid. In the case of the liquid containing a nonpolar solvent such as an aromatic solvent, if water is present in the liquid, phase separation occurs in the nozzle before discharging. Otherwise, a failure in discharging occurs because of a change in the wettability of the liquid to the inner surface of the nozzle. Furthermore, in the case of a solvent having a boiling point higher than that of water, when the functional layer is formed by evaporating the solvent in the droplet under predetermined conditions depending on the solvent, water rapidly evaporates. As a result, defects occur in the functional layer.

In this way, the Inventors confirmed that satisfactory luminescent characteristics and luminescent lifetime cannot be achieved and the frequent occurrence of defects due to, for example, the failure in discharging or the rapid evaporation of water also cannot be suppressed according to the art disclosed in the Patent Document.

In view of the above-described problems, the Inventors conceived the present invention including the following steps.

A method for producing an organic electroluminescent device including a first electrode, a second electrode, and a functional layer disposed between the first electrode and the second electrode, the functional layer including at least a luminescent layer, the method includes the steps of mixing a solvent and a functional material to produce a functional solution; and applying the functional solution to form the functional layer by a wet film formation process, wherein, before the functional solution is produced, the solvent is subjected to dehydration and deoxygenation in order to remove water and oxygen in the solvent.

In this way, a dehydrated and deoxygenated solvent is mixed with a functional material to produce a functional solution containing neither water nor oxygen. Next, the functional solution is applied to form a functional layer containing neither water nor oxygen. Consequently, the occurrence of defects and deterioration in the functional layer due to oxygen and water can be suppressed. As a result, an organic electroluminescent device can be produced with luminescent characteristics of high efficiency and prolonged lifetime. For example, with respect to a droplet discharging method in which droplets are discharged through a nozzle by exerting a predetermined force on a liquid, since a dehydrated and deoxygenated liquid is used in the nozzle, a stable discharge can be performed because of sufficient forces being exerted on the liquid. In the case of the solvent being a nonpolar solvent such as an aromatic solvent, the failure in discharging can be reduced by removing water in the solvent. Furthermore, in the case of a solvent having a boiling point higher than that of water, when the functional layer is formed by evaporating the solvent in the droplet, the amount of water rapidly evaporated can be reduced. Consequently, defects in the organic electroluminescent device can be suppressed. In the present invention, a layer used in an organic EL device, for example, a luminescent layer, a charge transporting layer, a carrier blocking layer, or a blocking layer for dissolution, is referred to as a “functional layer”.

In the above-described method for producing an organic electroluminescent device, the functional layer is formed in an inert gas atmosphere.

Thus, the functional layer can be formed in an atmosphere containing neither moisture nor oxygen.

Consequently, the occurrence of defects and deterioration in the functional layer due to oxygen and water can be suppressed. Therefore, an organic electroluminescent device with luminescent characteristics of high efficiency and prolonged lifetime and in which the occurrence of defects is suppressed can be produced.

In the above-described method for producing an organic electroluminescent device, each of the water content and the oxygen content in the solvent is 20 ppm or less after the dehydration and the deoxygenation.

In this way, when each of the water content and oxygen content in the solvent are 20 ppm or less after the dehydration and the deoxygenation, an organic electroluminescent device with luminescent characteristics of high efficiency and prolonged lifetime and in which the occurrence of defects is suppressed can be produced, compared with the case using the art disclosed in prior literature.

In the above-described method for producing an organic electroluminescent device, the solvent is a mixed solvent containing a plurality of types of solvents, the method further includes the steps of dehydrating and deoxygenating each of the plurality of types of solvents; and mixing the resulting solvents together.

Oxygen and water in each of the plurality of types of solvents can be removed. By mixing the solvents, the mixed solvent containing neither water nor oxygen can be produced. The functional solution is formed with the mixed solvent. Since the functional layer is formed with the functional solution, the functional layer containing neither water nor oxygen can be produced. Consequently, the occurrence of defects and deterioration in the functional layer due to oxygen and water can be suppressed. As a result, an organic electroluminescent device can be produced with luminescent characteristics of high efficiency and prolonged lifetime.

When a mixed solvent is produced and then is dehydrated and deoxygenated, the mixing ratio and the composition may be changed during the dehydration and the deoxygenation. In the present invention, a plurality of types of solvents each are dehydrated and deoxygenated, and then the resulting solvents are mixed together; hence, the mixing ratio and the composition can be controlled.

In the above-described method for producing an organic electroluminescent device, the wet film formation process is a droplet discharging process.

When the functional solution containing water is applied by a droplet discharging process, a film-forming ability is impaired by water in the functional solution.

In the present invention, the water in the solvent is removed by the dehydration. Thus, when a functional solution containing the solvent is applied by the droplet discharging process, the film-forming ability is improved.

An organic electroluminescent device includes the functional layer formed by the above-described method.

The functional layer is formed by applying the functional solution by the wet film formation process, the functional solution being produced by mixing the dehydrated and deoxygenated solvent and the functional material.

As a result, the deterioration and the occurrence of defects in the functional layer are suppressed. Thus, an organic electroluminescent device with luminescent characteristics of high efficiency and prolonged lifetime can be produced.

An electronic apparatus includes the above-described organic electroluminescent device.

Examples of the electronic apparatus include information processors such as cellular phones, personal digital assistants, clocks, word processors, and personal computers; large-screen television sets; and large monitors.

In this way, an electronic apparatus including a display section with luminescent characteristics of high efficiency and prolonged lifetime can be produced.

BRIEF DESCRIPTION OF THE DRAWINGS

FIG. 5 is a table showing an example of an organic EL device according to an embodiment of the present invention;

FIG. 6 is a table showing an example of an organic EL device according to an embodiment of the present invention;

FIG. 7 is a table showing an example of an organic EL device according to an embodiment of the present invention; and FIGS. 8A-3C show electronic apparatuses each provided with an organic EL device according to the present invention.

DETAILED DESCRIPTION OF EMBODIMENTS

Figure 1:
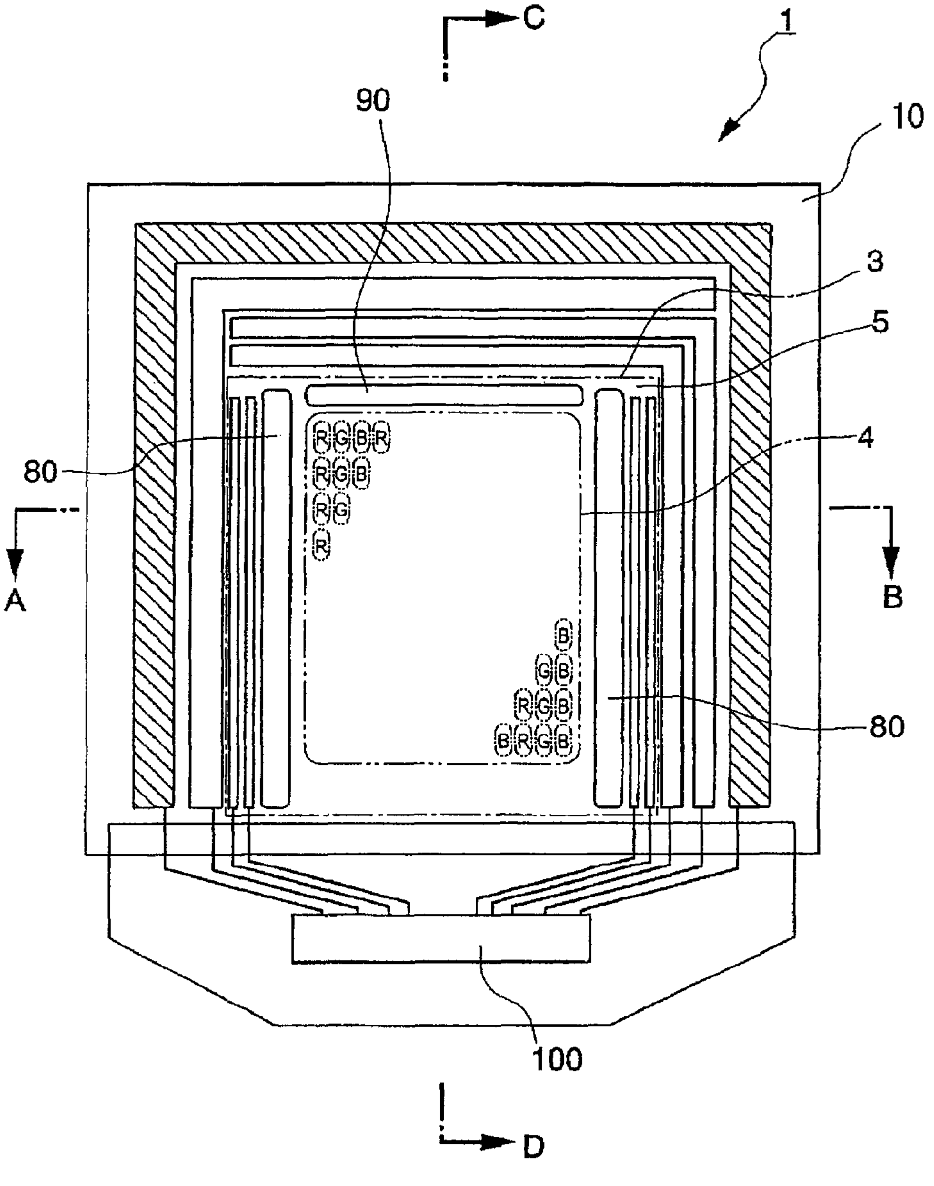
FIG. 1 is a plan view showing an organic EL device according to an embodiment of the present invention.

Embodiments of the present invention will be described below with reference to the drawings. The layers and components each have a different scale so as to be easily recognized in the drawings.

(Organic EL Device)

An organic EL device 1 of the embodiment as shown below is an active-matrix organic EL device including a thin-film transistor (hereinafter, referred to as "TFT") functioning as a switching element. In particular, the organic EL device 1 is a color organic EL device including three-types (red (R), green (G), and blue (B)) of organic polymeric luminescent layers.

FIG. 1 is a plan view showing the structure of an organic EL device according to the embodiment.

As shown in FIG. 1, the organic EL device 1 includes an insulating substrate 10; a pixel electrode region including pixel electrodes connected to switching TFTs (described below) and arrayed into a matrix on the substrate 10; and a pixel area 3 (within alternate long and short dashed lines in FIG. 1) that is substantially rectangular in plan view being located at least on the region including the pixel electrodes. The pixel area 3 is zoned into an actual display area 4 in the center of the pixel area 3 (within alternate long and two short dashes line in FIG. 1) and a dummy area 5 disposed around the actual display area 4 (an area between the alternate long and short dashed lines and the alternate long and two short dashes line).

In the actual display area 4, display areas R, G, and B, each having a pixel electrode, are arrayed at a distance in A-B and C-D directions. Scanning-lines-driving circuits 80 are disposed on both right and left sides of the actual display area 4 in FIG. 1. These scanning-lines-driving circuits 80 are disposed under the dummy area 5. Furthermore, a checking circuit 90 is disposed above the actual display area 4 in FIG. 1. The checking circuit 90 is also disposed under the dummy area 5. The checking circuit 90 for checking the operating state of the organic EL device 1 has, for example, means for outputting the results of checking to an external device (not shown) and inspects the defects or quality of displays at the time of shipping or during manufacturing.

Driving voltages are applied from a predetermined power supply through driving-voltage conductive lines to the scanning-lines-driving circuits 80 and the checking circuit 90. Driving-control signals and the driving voltages for the scanning-lines-driving circuits 80 and the checking circuit 90 are applied from a predetermined main driver to control the driving the organic EL device 1 through, for example, driving-control-signal conduction lines. The driving-control signals are defined as command signals from the main driver for controlling output signals from the scanning-lines-driving circuits 80 and the checking circuit 90.

The pixel structure of the organic EL device 1 will be described below with reference to FIG. 2.

Figure 2:
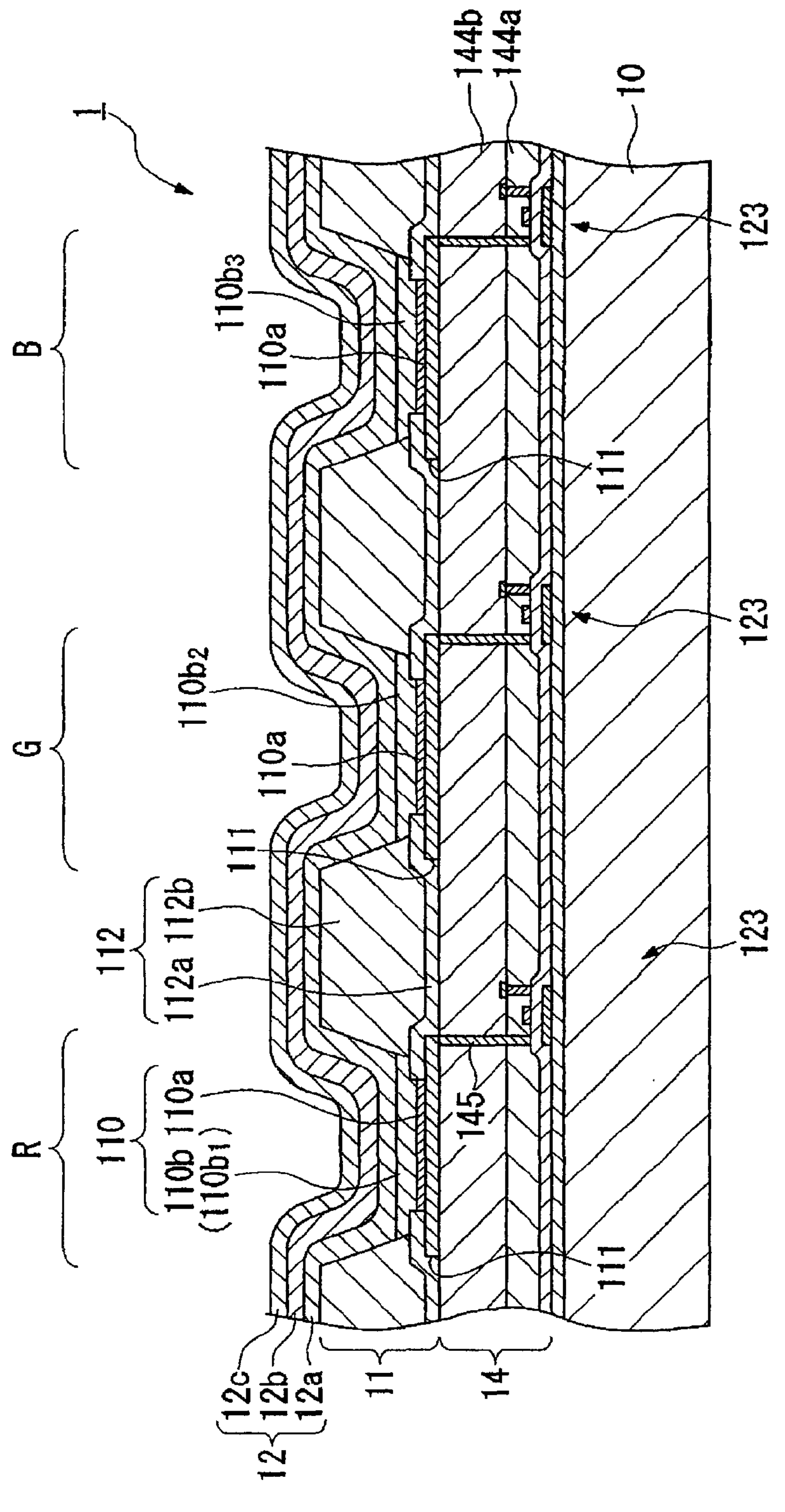
FIG. 2 is an enlarged cross-sectional view showing an organic EL device according to an embodiment of the present invention.

FIG. 2 is an enlarged cross-sectional view showing display region of the organic EL device 1.

FIG. 2 is a cross-sectional view of three pixel areas corresponding to red (R), green (G), and blue (B). The organic EL device 1 includes a circuit element region 14 including circuits such as TFTs, a pixel electrode (first electrode) 111, a luminescent element region 11 including a functional layer 110, and a cathode (second electrode) 12 on the substrate 10, formed in that order.

In the organic EL device 1, light emitted from the functional layer 110 toward the substrate 10 passes through the circuit element region 14 and substrate 10 and then emerges from the bottom of the substrate 10 toward an observer. On the other hand, light emitted from the functional layer 110 toward the opposite side of the substrate 10 is reflected by the cathode 12 and passes through the circuit element region 14 and substrate 10 and then emerges from the bottom of the substrate 10 toward an observer.

The circuit element region 14 includes a substrate protecting layer composed of silicon oxide on the substrate 10, driving TFTs 123 connected to the respective pixel electrodes 111, and interlayer insulating films 144*a* and 144*b*.

The luminescent element region 11 mainly includes the functional layers 110 stacked on the respective pixel electrodes 111 and bank regions 112 disposed between the functional layers 110, the functional layers 110 being separated by the bank regions 112. The cathodes 12 are disposed on the respective functional layers 110.

In the luminescent element region 11, each of the bank regions 112 includes an inorganic bank layer 112*a* adjacent to the substrate 10 and an organic bank layer 112*b* remote from the substrate 10, the organic bank layer 112*b* being stacked on the inorganic bank layer 112*a*.

Each of the functional layers 110 includes a hole injecting and/or transporting sublayer 110*a* stacked on the corresponding pixel electrode 111 and an organic EL sublayer (luminescent sublayer) 110*b* disposed on the hole injecting and/or transporting sublayer 110*a*.

The hole injecting and/or transporting sublayer 110*a* has the functions of injecting holes into the organic EL sublayer 110*b* and transporting holes inside the hole injecting and/or transporting sublayer 110*a*. By disposing such a hole injecting and/or transporting sublayer 110*a* between the pixel electrode 111 and the organic EL sublayer 110*b*, the organic EL sublayer 110*b* has improved properties, such as luminous efficiency and lifetime. Holes injected from the hole injecting and/or transporting sublayer 110*a* recombine with electrons injected from the cathode 12 to emit light.

The organic EL sublayers 110*b* are divided into the following three types in luminescent wavelength bands: an organic red EL sublayer 110*b*1 emitting red (R) light, an organic green EL sublayer 110*b*2 emitting green (G) light, and an organic blue EL layer 110*b*3 emitting blue (B) light. These organic EL sublayers 110*b*1 to 110*b*3 are arrayed into a predetermined arrangement (for example, strips).

The organic EL sublayers 110*b*, as described below, are formed by applying ink compositions by an inkjet process (a droplet discharging process or wet film formation process), the ink compositions each being produced by mixing a dehydrated and deoxygenated solvent and the corresponding organic polymer EL material.

The cathode 12 is provided over the entire surface of the luminescent element region 11 and is paired with each of the pixel electrodes 111 to feed current through the corresponding functional layer 110. The cathode 12 is composed of a lithium fluoride layer 12*a*, a calcium layer 12*b*, and aluminum layer 12*c*, stacked in that order.

(Method for Producing Organic EL Device)

A method for producing an organic EL device will be described below with reference to FIGS. 3 and 4.

Figure 3A:
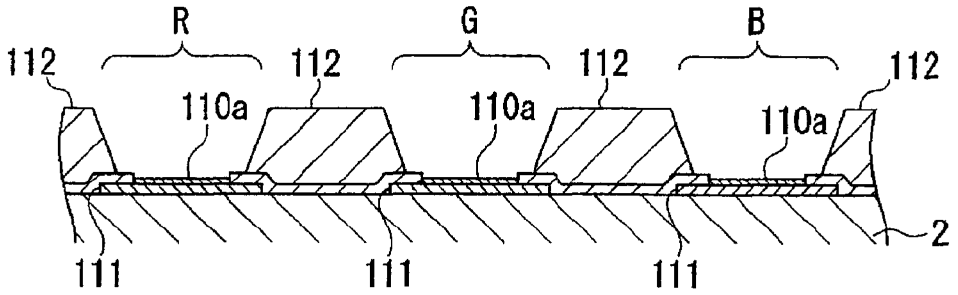
FIGS. 3A-3C are process charts illustrating a method for producing of an organic EL device according to an embodiment of the present invention.
Figure 3B:
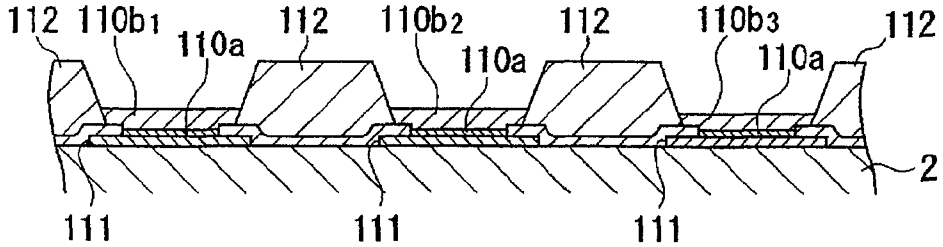
Figure 3C:
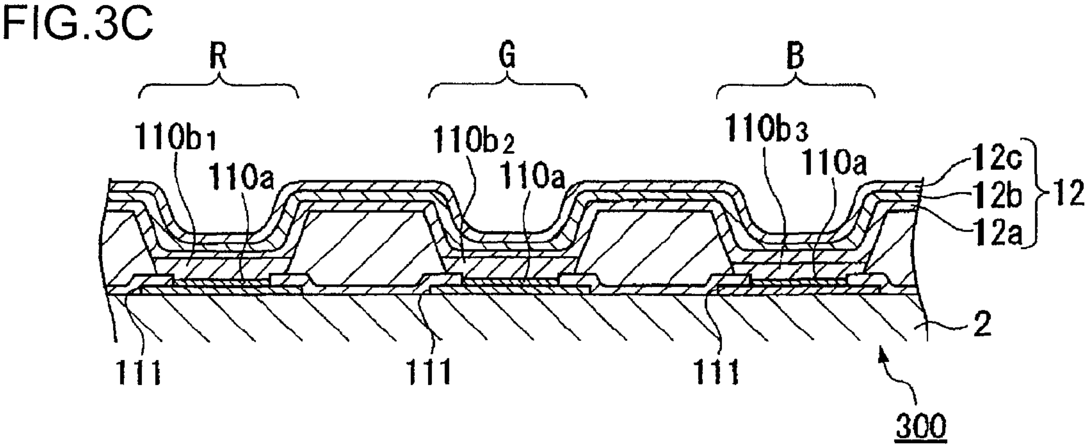

FIG. 3 shows the steps of stacking the hole injecting and/or transporting sublayers 110*a*, the organic EL sublayers 110*b*, and the cathode 12, on the respective pixel electrodes 111, formed in that order. FIG. 4 shows dehydration and deoxygenation of the solvent included in an ink composition for the organic EL sublayer 110*b*.

(Dehydration and Deoxygenation of Solvent)

Dehydration and deoxygenation of a solvent included in a functional solution used in forming the organic EL sublayer 110*b* will be described below with reference to FIG. 4.

Figures 4A, 4B, 4C, 4D, 4E:
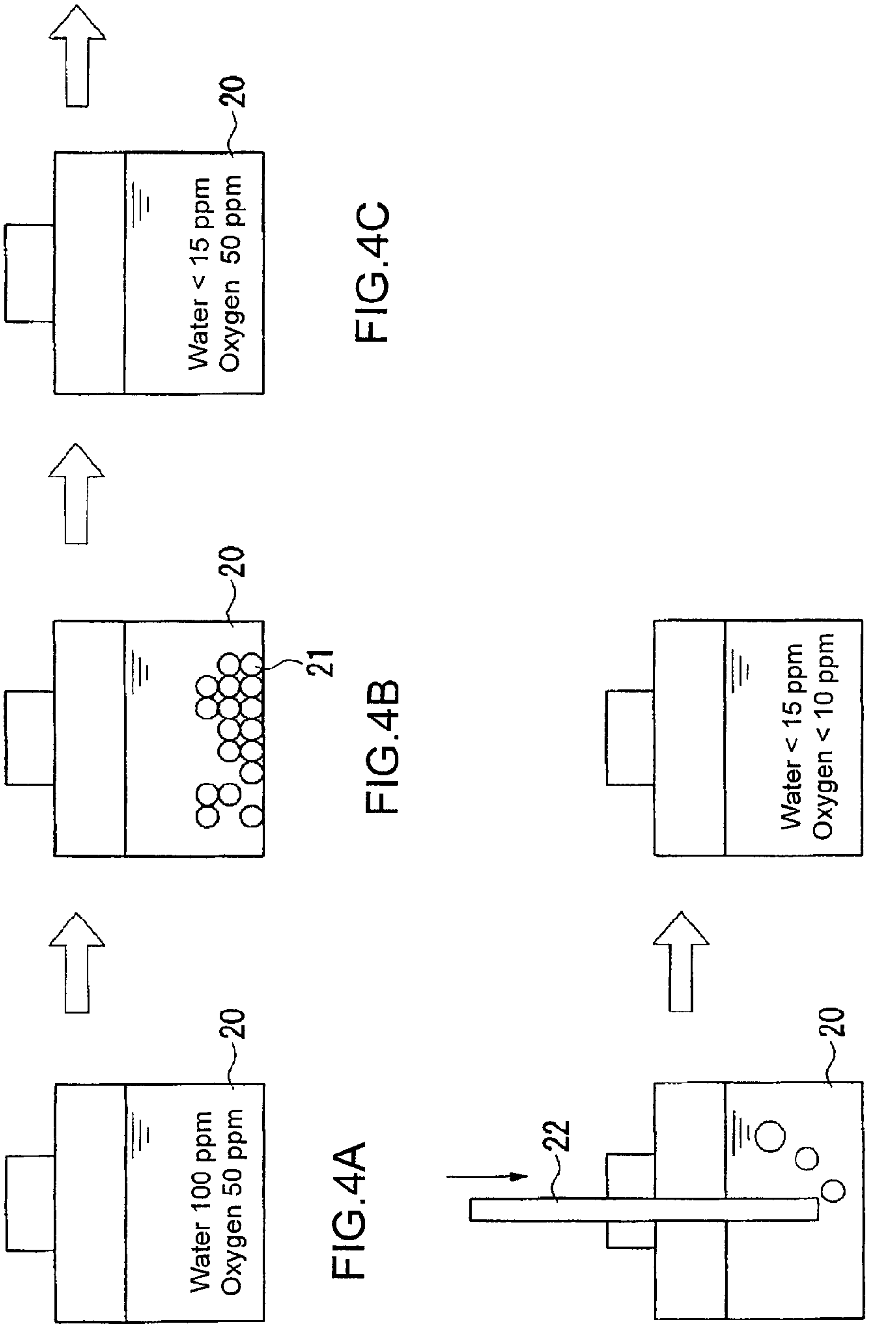
FIGS. 4A-4E are schematic views illustrating dehydration and deoxygenation.

As shown in FIG. 4 (*a*), a solvent 20 is prepared.

The moisture content and the oxygen content in the solvent 20 are about 100 ppm and 50 ppm, respectively.

As shown in FIG. 4 (*b*), dehydration in which water in the solvent 20 is removed is performed.

The dehydration is performed by placing molecular sieves 21 functioning as a water absorbent in the solvent 20. The molecular sieves 21 are brought into contact with water in the solvent 20 and absorb the water.

As shown in FIG. 4 (*c*), the molecular sieves 21 are removed. Consequently, water in the solvent 20 is removed. The water content in the solvent 20 is 15 ppm or less.

As shown in FIG. 4 (*d*), deoxygenation in which oxygen dissolved in the solvent 20 is removed is performed.

The deoxygenation is performed by bubbling a nitrogen ($N_2$) gas (inert gas) through the solvent 20. A gas feeding tube 22 is dipped into the solvent 20 and a $N_2$ gas is fed into the solvent 20 through the gas introducing tube 22. Oxygen in the solvent 20 is removed from the solvent 20 by the bubbling.

As shown in FIG. 4 (*e*), when the bubbling of the $N_2$ gas is finished, the oxygen content in the solvent 20 is 10 ppm or less.

The dehydration and the deoxygenation shown in FIGS. 4 (*a*) to 4 (*e*) are performed in a glove box filled with an inert gas. Thus, the dehydration and the deoxygenation are performed in the $N_2$ gas. In order to further remove the water in the solvent 20, the solvent 20 may be heated.

An organic polymer EL material (functional material) is dissolved into the dehydrated and deoxygenated solvent 20 described above. This step is performed in an inert gas having a water content and oxygen content of 100 ppm, respectively. The organic polymer EL material also has oxygen and water. Thus, the organic polymer EL material is preferably dissolved after the organic polymer EL material is subjected to vacuum drying or drying by heating.

A method for producing an organic EL device will now be described with reference to FIG. 3.

In FIG. 3, the circuit element region 14 including the driving TFTs 123, the bank regions 112 (inorganic bank layer 112*a* and organic bank layer 112*b*), and the pixel electrodes 111, which are shown in FIG. 2, are already provided on the substrate 10.

In the method for producing an organic EL device, an inkjet process (droplet discharging process or wet film formation process) is mainly employed.

Examples of the inkjet process include a charge regulating process, a pressure oscillation process, an electromechanical transduction process, an electrothermal conversion process, and an electrostatic suction process. In the charge regulating process, a material electrically charged with a charging electrode is discharged from a nozzle while the flying direction of the charged material is controlled by a deflecting electrode. In the pressure oscillation process, a material is discharged from a nozzle by the application of ultra-high pressure. When a control voltage is not applied, the material goes straight and is discharged from the nozzle. When the control voltage is applied, electrostatic repulsion occurs. As a result, the material is scattered and thus not discharged from the nozzle. In the electromechanical transduction process (piezo-process), the deformation of a piezoelectric element caused by a pulsed electric signal is utilized. The deformation of the piezoelectric element applies pressure to a space containing a material via a flexible component. As a result, the material is pushed out from the space and discharged from the nozzle. In the electrothermal conversion process, a material is rapidly vaporized by heating with a heater provided in a space containing the material, thus generating a bubble. The material is discharged by the pressure of the bubble. In the electrostatic suction process, a space containing a material is slightly pressurized to generate a meniscus state of the material in a nozzle. Then, the material is drawn out by the application of electrostatic attraction. In addition, for example, a process for using a change in the viscosity of a fluid by the application of an electric field or a process for discharging a material by an electric spark is available. Among these, in the piezo-process, the material is not heated; hence, the solvent 20 is not evaporated. Therefore, the piezo-process advantageously has little effect on the composition of the material.

In this embodiment, the inkjet process is performed in an inert gas containing a water content and a oxygen content of 100 ppm or less, respectively. As a result, the contamination of a dehydrated and deoxygenated ink composition with moisture and oxygen can be suppressed.

As shown in FIG. 3 (*a*), the hole injecting and/or transporting sublayers 110*a* are formed at opening sections between the bank regions 112.

The above-described inkjet process is employed as a process for producing the hole injecting and/or transporting sublayers 110*a*. Before the inkjet process is performed, a ink composition containing a material for the hole injecting and/or transporting sublayers 110*a* is charged into a discharge head, and then the discharging nozzle of the discharging head is opposed to the pixel electrode 111 provided in the opening sections between the bank regions 112. Droplets in which the amount of a single droplet is controlled are discharged from the discharging nozzle, while the discharging head and the substrate 10 are relatively moved. The discharged droplets are dried to evaporate the polar solvent in the ink composition into hole injecting and/or transporting sublayer 110*a*.

Examples of the ink composition used include a mixture of poly(ethylenedioxythiophene) (PEDOT) with polystyrene sulfonic acid (PSS), polythiophene derivatives, polyaniline, polyaniline derivatives, and triphenylamine derivatives. Examples of the polar solvent include isopropyl alcohol (IPA), n-butanol, γ-butyrolactone, N-methylpyrrolidinone (NMP), 1,3-dimethyl-2-imidazolidinone (DMI) and its derivatives, and glycol ethers such as carbitol acetate and butyl carbitol acetate.

As shown in FIG. 3 (*b*), the organic EL sublayers 110*b* (110*b*1, 110*b*2, and 110*b*3) are formed on the hole injecting and/or transporting sublayer 110*a*.

The inkjet process is employed as a process for producing the organic EL sublayer 110*b* similar to the process for the hole injecting and/or transporting sublayer 110*a*. Before the inkjet process is performed, a discharging head (not shown) is filled with an ink composition for the organic EL sublayer 110*b*. The ink composition contains an organic polymer EL material and a solvent. The solvent is subjected to dehydration and deoxygenation as shown in FIG. 4.

The discharging nozzle of the discharging head is opposed to the hole injecting and/or transporting sublayer 110*a* provided in the opening sections between the bank regions 112. Droplets in which the amount of a single droplet is controlled are discharged from the discharging nozzle, while the discharging head and the substrate 10 are relatively moved. The discharged droplets are dried to evaporate the polar solvent in the ink composition into the organic EL sublayer 110*b*. In this way, the organic EL sublayers 110*b*1, 110*b*2, and 110*b*3 are formed at the respective opening sections between the bank regions 112.

The ink composition is composed of a known luminescent material such as a fluorescent material or a phosphorescent material. In particular, in this embodiment, each of the organic EL sublayers 110*b* is provided so that luminescent wavelength bands of the organic EL sublayers 110*b* correspond to three primary colors of light in order to display full-color images. That is, a single pixel element is composed of three organic EL layers (dots), i.e., the organic EL layer corresponding to red, the organic EL layer corresponding to green, and the organic EL layer corresponding to blue, respectively, in luminescent wavelength bands. These layers emit light with intermediate tones. Therefore, the organic EL device 1 displays full-color images.

Suitable examples of the organic polymer EL material include polyfluorene (PF) derivatives, poly(ρ-phenylene vinylene) (PPV) derivatives, poly(ρ-phenylene) (PPP) derivatives, polyvinyl carbazole (PVK), polythiophene derivatives, and polysilanes such as poly(methylphenylsilane) (PMPS).

These polymeric materials may be doped with pigments such as perylene pigment, coumalin pigment, and rhodamine pigment; or low-molecular-weight materials such as rubrene, perylene, 9,10-diphenylanthracene, tetraphenylbutadiene, Nile red, coumalin 6, and quinacridone.

Solvents for an organic polymer red EL material and an organic polymer green EL material preferably include, for example, 1,2,4-trimethylbenzene, dihydrobenzofuran, or cyclohexylbenzene.

A solvent for an organic polymer blue EL material preferably includes, for example, dihydrobenzofuran, or cyclohexylbenzene.

When a nonpolar solvent such as an aromatic solvent is used as the solvent, since the solvent is hardly compatible with water, the failure of discharging can be reduced by removing water in the solution. A mixed solvent containing a solvent having a boiling point of 150° C. or more is preferably used as the solvent for the polymeric material. Examples of the solvent having a high boiling point (bp) include dodecylbenzene (bp 331° C.), cyclohexylbenzene (bp 240° C.), 1,2,3,4-tetramethylbenzene (bp 203° C.), 3-isopropylbiphenyl (bp 290° C.), 3-methylbiphenyl (bp 272° C.), 4-methylbiphenyl (bp 267° C.), ρ-anisyl alcohol (bp 259° C.), 1-methylnaphthalene (bp 240° C. to 243° C.), 1,2,3,4-tetrahydronaphthalene (bp 207° C.), and derivatives of these compounds. When an ink composition, which contains such a solvent having a high boiling point, for the organic EL device is discharged with an inkjet apparatus, the solvent does not evaporate readily. Consequently, a uniform organic EL device can be produced because the difference between a pixel element immediately after discharging and the pixel element after a certain time period can be reduced. However, if a solvent having a high boiling point has above a certain water content, the water rapidly evaporates in producing the functional layer by evaporating the solvent in the droplet. As a result, defects occur in the functional layer. The present invention can suppress the defects due to the removal of water. In the case of a droplet discharging process, the use of such a solvent having a high boiling point increases the viscosity, thus causing unstable discharging. Therefore, a mixed solvent containing at least two solvents including a solvent having a high boiling point is preferably used.

In a method for producing an organic EL device, a mixed solvent containing a plurality of types of solvents is used. In the step of producing the mixed solvent, after each of the plurality of types of the solvents is subjected to the dehydration and deoxygenation, the solvents are preferably mixed together. In this case, the present invention is applicable. That is, each of the plurality of types of the solvents is preferably subjected to dehydration and deoxygenation, and then a mixed solvent is produced. When dehydration and deoxygenation are performed after a mixed solvent is produced, the composition may be changed by the dehydration and deoxygenation. In the present invention, each of a plurality of types of solvents is subjected to the dehydration and deoxygenation, and then the solvents are mixed together. Thus, a change in the composition of the mixed solvent can be suppressed.

As shown in FIG. 3 (*c*), the cathode 12, which is paired with each of the pixel electrodes 111, is formed.

That is, lithium fluoride layer 12*a*, calcium layer 12*b*, and aluminum layer 12*c* are stacked over the entire surface of the substrate 10 including the bank regions 112 and the organic EL sublayers 110*b*, formed in that order, to form the cathode 12. As a result, the cathode 12 is provided over the organic EL sublayer 110*b* including the organic red EL sublayer 110*b*1, the organic green EL sublayer 110*b*2, and an organic blue EL layer 110*b*3. Consequently, organic EL elements corresponding to red (R), green (G), and blue (B) are formed.

The cathode 12 is preferably formed by, for example, vapor deposition, sputtering, or CVD. In particular, vapor deposition is more preferably used from the stand point of the prevention of the damage of the organic EL sublayers 110*b* by heating. A protective layer composed of, for example, $SiO_2$ or SiN may be provided on the cathode 12 in order to prevent oxidation.

The substrate 10 is sealed with a resin sealant and a sealing substrate. For example, a resin sealant composed of a thermosetting resin or UV curable resin is applied the peripheral portion of the substrate 10 and the sealing substrate is disposed on the resin sealant. Such a sealing step is preferably performed in a nitrogen gas or in an inert gas atmosphere such as argon or helium. When the step is performed in air, if the cathode 12 has a defect such as a pin hole, moisture, oxygen, and the like enter the cathode 12, and then the cathode 12 may be oxidized, thus being not preferable.

EXAMPLES

The present invention will now be described in detail based on an example.

FIG. 5 is a table showing the effects of dehydration and deoxygenation. FIG. 5 also shows the water content and the oxygen content in the solvent 20 and the number of failed films of the organic EL sublayers 110*b* formed with the corresponding solvent 20. In FIG. 5, in case 1, both dehydration (molecular sieves: MS) and deoxygenation ($N_2$ bubbling: $N_2$) are performed. In case 2, dehydration (MS) is performed alone. In case 3, dehydration and deoxygenation are not performed (No).

As shown in FIG. 5, in case 1, the water content and oxygen content in the solvent 20 were 5 to 15 ppm and 10 ppm, respectively. The number of failed films of the organic EL sublayers 110*b* formed with the solvent 20 subjected to the treatment according to case 1 was 0.

In case 2, the water content and oxygen content in the solvent 20 were 10 to 15 ppm and 50 ppm, respectively. The number of failed films of the organic EL sublayers 110*b* formed with the solvent 20 subjected to the treatment according to case 2 was several.

In case 3, the water content and oxygen content in the solvent 20 were 100 ppm and 50 ppm. The number of failed films of the organic EL sublayers 110*b* formed with the solvent 20 subjected to the treatment according to case 3 was 100 or more.

As shown in FIG. 5, by subjecting the solvent 20 to both dehydration and deoxygenation, the water content and the oxygen content in the solvent 20 can be surely suppressed. It was revealed that the number of failed films of the organic EL sublayers 110*b* formed with the solvent 20 is reduced.

FIG. 6 is a table showing the effect of an atmosphere used in forming a film by an inkjet process. FIG. 6 also shows the element lifetimes and luminous efficiencies of the organic EL sublayers 110*b* formed in an inert gas atmosphere or in air.

In FIG. 6, in case 4, the organic EL sublayers 110*b* was formed in a $N_2$ gas atmosphere (inert gas atmosphere: $N_2$). In case 5, the organic EL sublayers 110*b* was formed in air.

In cases 4 and 5, an ink composition containing the solvent produced in case 1 shown in FIG. 5 was applied to form the organic EL sublayers 110*b*.

As shown in FIG. 6, the organic EL sublayers 110*b* formed in the $N_2$ atmosphere in case 4 improved about double in lifetime compared with that in case 5. The luminous efficiency improved about 1.3 times that in case 5.

As shown in FIG. 6, it was found that the formation of organic EL sublayers 110*b* by the inkjet process in the $N_2$ gas atmosphere improved the lifetime and luminous efficiency compared with that in air.

FIG. 7 provides a summary of FIGS. 5 and 6 and is a table showing the effect of the dehydration, deoxygenation, and the atmosphere in forming a film.

As shown in FIG. 7, according to the present invention, an excellent or good result was achieved compared with the result according to the known art. The known art was performed in the following conditions: the solvent 20 was not subjected to neither dehydration nor deoxygenation; and the inkjet process was performed in the $N_2$ gas atmosphere (known art). That is, when the dehydration and deoxygenation were performed (MS+N2) and the inkjet process was performed in air (Air), a good result was achieved compared with that of the known art. Furthermore, when the dehydration and deoxygenation were performed (MS+N2) and the inkjet process was performed in the $N_2$ gas, the best result was achieved (excellent).

In this example, the untreated solvent 20 had a water content of about 100 ppm and an oxygen content of about 50 ppm. By subjecting the solvent 20 to the dehydration and deoxygenation, the water content and the oxygen content each can be 20 ppm or less. Thus, oxygen and water, which cause the deterioration of the organic EL sublayer 110*b* (growth of defects, reduction in luminance, and increase in driving voltage), can be removed. The formation of the organic EL sublayers 110*b* with the solvent 20 can improve the lifetime of the organic EL device 1.

Conventionally, when the organic EL sublayers 110*b* were formed with a solvent not subjected to dehydration and deoxygenation by the inkjet process, the failure of the organic EL sublayers 110*b* frequently occurred. By reducing the water content in the solvent 20 to 20 ppm or less, the film-forming ability can be improved and the prevention of failure of the organic EL sublayers 110*b* can be significantly improved.

When an ink composition containing the dehydrated and deoxygenated solvent 20 is applied by the inkjet process in an atmosphere in which the moisture content and the oxygen content are 100 ppm or less, respectively, the oxygen content and water content in the organic EL sublayer 110*b* can be reduced. Thus, the lifetime and luminous efficiency can be improved. As a result, oxygen and water, which cause the deterioration of the organic EL sublayer 110*b* (growth of defects, reduction in luminance, and increase in driving voltage), can be further removed. Therefore, the organic EL device 1 capable of stably working for a long period can be achieved.

As described above, in this embodiment, since an ink composition, which is used for the organic EL sublayer 110*b*, contains the solvent 20 subjected to dehydration and deoxygenation, the ink composition in which water and oxygen are removed can be produced. Then, the ink composition is applied by an inkjet process to form the organic EL sublayers 110*b*; hence, the organic EL sublayers 110*b* in which water and oxygen are removed can be produced. Therefore, in the organic EL sublayers 110*b*, the deterioration and occurrence of defects due to oxygen and water can be suppressed. As a result, the organic EL device 1 with luminescent characteristics of high efficiency and prolonged lifetime and in which the occurrence of defects is suppressed can be produced.

Since the inkjet process is performed in an inert gas atmosphere, the organic EL sublayers 110*b* can be formed in an oxygen- and moisture-free atmosphere. This can further improve the effect described above.

In the inkjet process, by subjecting the solvent 20 to dehydration and deoxygenation, the film-forming ability of the ink composition is improved. As a result, the failure of the organic EL sublayers 110*b* can be significantly improved. In this embodiment, the organic EL sublayers 110*b* formed by the inkjet process has been described, but the present invention is not limited to this. Various film-forming process, for example, printing, may be employed other than the inkjet process.

Furthermore, in this embodiment, the method for producing an organic EL device including the organic EL sublayers 110*b* has been described, but the present invention is not limited to this. The present invention is useful for organic semiconductors, organic transistors, and organic semiconductor lasers other than the organic EL device.

(Modification of Method for Producing Organic EL Device)

The modification of a method for producing an organic EL device will be described below.

For the same structure as in the above-described embodiment, the same reference numerals are used for simplification.

In this modification, an ink composition is produced with a mixed solvent containing a plurality of types of solvents. The case in which dihydrobenzofuran and cyclohexylbenzene are used as the solvents will be described below.

Before the solvents are mixed together, each of the solvents are subjected to dehydration and deoxygenation. As shown in FIG. 4, dihydrobenzofuran is dehydrated and then deoxygenated. As a result, the water content and the oxygen content in the dihydrobenzofuran are 20 ppm or less, respectively.

As shown in FIG. 4, cyclohexylbenzene is dehydrated and then deoxygenated. As a result, the water content and the oxygen content in the cyclohexylbenzene are 20 ppm or less, respectively.

In an inert gas atmosphere, the dehydrated and deoxygenated dihydrobenzofuran and cyclohexylbenzene are mixed together to produce a mixed solvent.

An organic polymer EL material is dissolved into the resulting mixed solvent. This step is preferably performed in an inert gas atmosphere in which the moisture content and the oxygen content are controlled up to 100 ppm. Since the organic polymer EL material also has oxygen and water, the organic polymer EL material is preferably dissolved after the organic polymer EL material is subjected to vacuum drying or drying by heating.

As described above, in this modification, each of dihydrobenzofuran and cyclohexylbenzene, which are constituting the mixed solvent, is subjected to the dehydration and deoxygenation, and then the solvents are mixed together to produce the mixed solvent. Thus, the mixed solvent in which oxygen and water are removed can be produced.

When a mixed solvent is produced and then is dehydrated and deoxygenated, the mixing ratio and the composition may be changed during the dehydration and the deoxygenation. In the present invention, a plurality of types of solvents each are dehydrated and deoxygenated, and then the resulting solvents are mixed together; hence, the mixing ratio and the composition can be controlled.

(Electronic Apparatus)

Figure 8A:
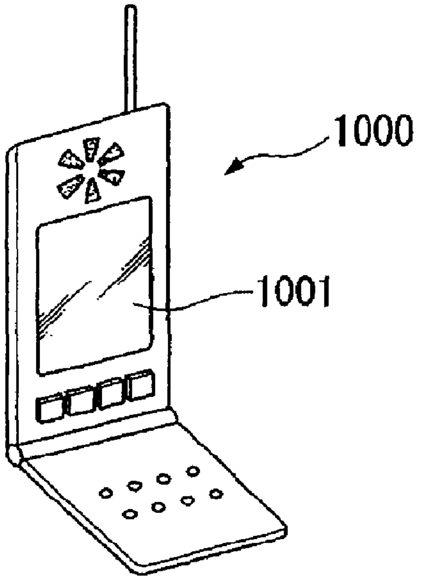
Figure 8B:
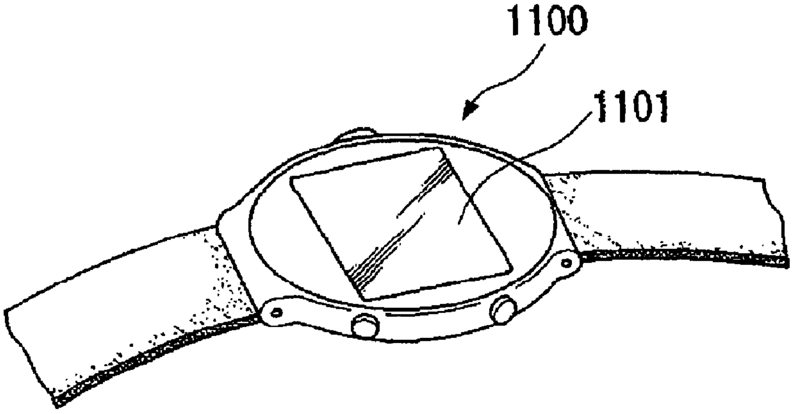
Figure 8C:
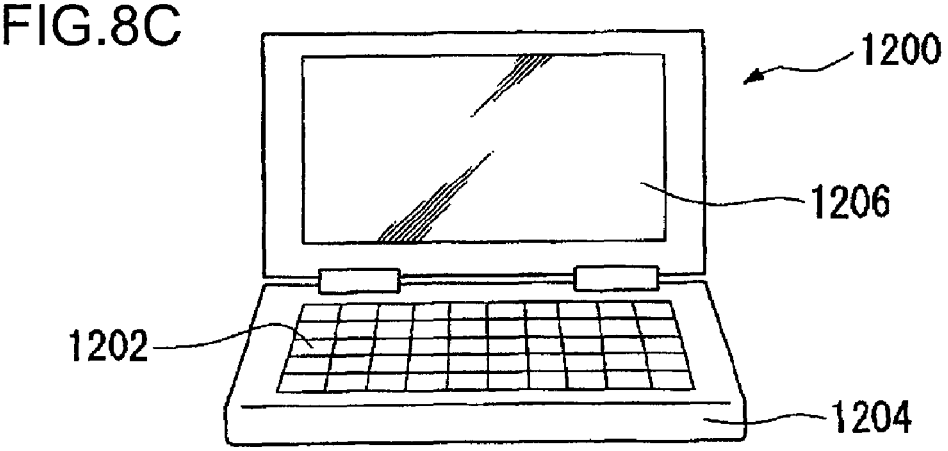

FIGS. 8 (*a*) to (*c*) show examples of electronic apparatuses according to the present invention.

The electronic apparatuses of the examples each include an organic EL device such as the above-described organic EL device functioning as a displaying means.

FIG. 8 (*a*) is a perspective view showing an example of cellular phone. Reference numeral 1000 represents a main body of the cellular phone, and reference numeral 1001 represents a display used as the display.

FIG. 8 (*b*) is a perspective view showing one example of electronic apparatus of a wristwatch type. Reference numeral 1100 represents a main body of the wristwatch, and reference numeral 1101 is a display used as the EL display.

FIG. 8 (*c*) is a perspective view showing an example of a portable information-processing apparatus such as a word processor or a personal computer. Reference numeral 1200 is an information processing apparatus, reference numeral 1202 is an input device such as a keyboard, reference numeral 1204 is a main body of the information processing apparatus, and reference numeral 1206 is a display used as the EL display.

These electronic apparatuses shown in FIGS. 8 (*a*) to (*c*) are each provided with a display including the organic EL devices of the present invention; hence, an electronic apparatus with luminescent characteristics of high efficiency and prolonged lifetime and in which the occurrence of defects is suppressed can be produced.

While the present invention has been described with reference to exemplary embodiments, it is to be understood that the invention is not limited to the disclosed embodiments. The shapes and combination of components shown in the above-described embodiments are merely examples and can be modified based on design requirements within the spirit and scope of the present invention.

What is claimed is:

1. A method of producing an ink for forming a functional layer that is contained in an organic electroluminescent device, the method comprising:

dehydrating a first solvent and a second solvent by placing molecular sieves functioning as a water absorbent in order to remove water content in the first solvent and the second solvent, both the first solvent and the second solvent having a boiling point of 150° C. or more;

deoxygenating the first solvent and the second solvent by bubbling of N2 gas in order to remove water content and oxygen content in the first solvent and the second solvent after dehydrating the first solvent and the second solvent, each of the water content and the oxygen content in the first and the second solvents being 20 ppm or less after the dehydration and the deoxygenation;

mixing the first solvent and the second solvent to produce a mixed solvent after dehydrating and deoxygenating the first solvent and the second solvent individually; and producing an ink by mixing the mixed solvent and a functional material.

2. The method of producing an ink according to claim 1, the dehydrating and deoxygenating the first solvent and the second solvent including at least heating the first solvent or the second solvent.

3. The method of producing an ink according to claim 1, wherein the dehydration and deoxygenation of each solvent is performed in N2 gas.

* * * * *